United States Patent [19]

Huynh-Ba

[11] Patent Number: 5,234,993

[45] Date of Patent: Aug. 10, 1993

[54] PROCESS FOR MAKING POLYAMIDE/POLYOLEFIN BLENDS HAVING SUPERIOR IMPROVED TOUGHNESS AND STIFFNESS

[75] Inventor: Gia Huynh-Ba, Hockessin, Del.

[73] Assignee: E. I. Du Pont de Nemours and Company, Wilmington, Del.

[21] Appl. No.: 789,685

[22] Filed: Nov. 8, 1991

[51] Int. Cl.$^5$ .............. C08L 77/00; C08L 51/04; C08L 23/12

[52] U.S. Cl. ..................... 525/66; 525/179; 525/181; 525/182; 525/183

[58] Field of Search ............ 525/66, 179, 181, 182, 525/183

[56] References Cited

U.S. PATENT DOCUMENTS

| | | | |
|---|---|---|---|
| 4,174,358 | 11/1979 | Epstein | 525/183 |
| 4,780,505 | 10/1988 | Mashita et al. | 525/66 |
| 4,988,764 | 1/1991 | Nishio | 525/179 |
| 5,006,601 | 4/1991 | Lutz | 525/66 |

FOREIGN PATENT DOCUMENTS

| | | | |
|---|---|---|---|
| 59-78256 | 5/1984 | Japan . | |
| 122546 | 7/1984 | Japan | 525/66 |
| 126462 | 7/1984 | Japan | 525/66 |
| 131648 | 7/1984 | Japan | 525/66 |
| 59-149940 | 8/1984 | Japan . | |

OTHER PUBLICATIONS

Paper by Modic et al. in "Plastics Engineering" Jul. 1991 pp. 37-39.

*Primary Examiner*—David J. Buttner
*Attorney, Agent, or Firm*—Paul R. Steyermark

[57] ABSTRACT

A process for melt-blending a polyamide with a crystalline polyolefin incompatible therewith in the presence of a rubbery compatibilizing polymer capable of chemically or physically associating with both the polyamide and the polyolefin, at a process temperature higher than the highest melting temperature of any crystalline polymer present and higher than the highest glass transition temperature of any amorphous polymer present but such that significant degradation of any polymer present does not occur, all blend components being present within stated ranges, and the melt viscosity ratio of the polyamide to that of the polyolefin at the process temperature and a shear rate of about 100–200 sec$^{-1}$ being about 0.1–1.2, especially 0.4–0.8. High stiffness, supertough polymer blends, where notched Izod impact strength exceeds 535 J/m, are obtained.

8 Claims, 5 Drawing Sheets

PROCESS FOR MAKING POLYAMIDE/POLYOLEFIN BLENDS HAVING SUPERIOR IMPROVED TOUGHNESS AND STIFFNESS

BACKGROUND OF THE INVENTION

This invention relates to a process for preparing polyamide/polyolefin blends having superior toughness and stiffness compared with currently available blends of such polymers.

Polyamide resins (or polyamides) are well known in the art and have been used for many years, i.a., as engineering or molding resins, fiber-forming resins, and barrier resins in packaging materials. Crystalline polyamides, especially those made from short chain monomers, e.g., nylon 6 and nylon 66, are very stiff, which is desirable for molding resins, but they are sensitive to moisture. Addition of crystalline polyolefins, such as polyethylene or polypropylene reduces moisture sensitivity but suffers from incompatibility between these two polymers, so that acceptable end-use blends are not made. Further, although polyamides have good physical properties, such as tensile strength and flexural (or flex) modulus, that make these resins suitable for fabricating a variety of articles, they are not considered tough. Their notched Izod impact strength either is too low under ordinary test conditions or decreases significantly with a modest change of temperature, thickness, orientation, or notch radius. It, therefore, is conventional in the industry to toughen polyamide resins by blending them with soft, rubbery polymers which can absorb mechanical shocks without significantly impairing the tensile properties of the polyamides with which they are blended. However, because those soft polymers normally have very low stiffness (or flex moduli), addition of such polymers to thermoplastic resins normally results in blends that have lower flex moduli than the matrix resins alone, so that improvement of one property is accomplished at the sacrifice of the other.

While there is abundant art describing such blends, the most pertinent patent in this area is U.S. Pat. No. 4,174,358, to Epstein, describing blends of polyamides with various types of toughening polymers. The Epstein invention involves a process for the preparation of multiphase thermoplastic compositions comprising admixing a defined polyamide matrix resin with at least one of a number of possible polymers having a much lower tensile modulus and containing sites which are adherent to the matrix resin, and then shearing to disperse the polymer in the matrix resin to a particle size of 0.01 to 3 microns, so that the polymer adheres to the matrix resin. According to the patent specification and certain examples, the blend may be either binary or ternary. A ternary blend contains the matrix resin, a soft, adherent polymer, and a third soft polymer, which may or may not possess adherent sites; when it does not, it is a straight chain or branched polyethylene. Such blends can be made in one step, or the soft polymers can be preblended and then re-extruded with the matrix resin. Additional compositions of this type are described in Japanese Patent Publications (Kokai) 59-78256 and 59-149940 (both 1984) of Mitsui Petrochemical Industries, Ltd.

U.S. Pat. No. 4,780,505 to Mashita et al. describes a process where polypropylene grafted with maleic anhydride is added to a polyamide/polypropylene blend to improve the compatibility of the blend. This grafted polymer can be replaced by or added together with another polymer, such as a rubber grafted with maleic anhydride or an ethylene copolymer containing a maleic anhydride or glycidyl methacrylate comonomer.

A recent paper by Modic et al. in Plastics Engineering, July 1991, pp. 37-39, describes blends of nylon 66 with polypropylene and of nylon 6 with polypropylene, both with a compatibilizer-styrenic block copolymer functionalized with maleic anhydride-which have high impact strength. The paper discusses mainly the situation where polypropylene becomes the matrix and nylon the dispersed phase, although the possibility of phase inversion in the case of a large nylon/polypropylene ratio is mentioned.

It thus is known that one can make ternary blends with desirable mechanical properties by properly selecting the component polymers A, B, and C in optimum ratios and blending them under suitable conditions. Ternary blends, when properly made, can provide a more desirable balance of properties than binary blends; yet, in practice these terms "properly", "optimum" and "suitable" are very broad and undefined. Even for skilled plastics engineers and chemists, this is a rather occult art, which requires a great deal of experimentation before a satisfactory composition is obtained. Normally, the matrix polymer A is preselected according to the business need; the two other components B and C are then varied, either with respect to their characteristics or amounts, or both, and one or more plots or tables reflecting the changes of desired properties with changing compositions are made. Usually, those plots or tables show a trend of either increasing or decreasing property values as the compositions are varied. When the desired properties have been obtained, the operation is considered successful, and the blend is adopted for commercial purposes. In some cases, with a particular matrix resin, the experimenter may find that the desired properties are difficult or impossible to obtain; the experimenter then has the choice of making do with what he or she has or replacing the matrix resin with another matrix resin and repeating the series of experiments. By following the directives of the Epstein patent, one can in some cases obtain "supertough" nylon resins, which for the purpose of the present invention means that their notched Izod value is at least 10 ft.-lb/inch (about 534 J/m).

Crystalline polyolefins such as, for example, polyethylene, polypropylene, and polyisobutylene are often considered suitable polymers for blending with polyamides because they improve the polyamide toughness while reducing the stiffness of polyamides to a lesser degree than do amorphous and rubbery polyolefins. However, binary blends of polyamides with crystalline polyolefins do not show greatly improved toughness. Addition of a third component, or compatibilizer, permits a more thorough blending, resulting in a better dispersion, so that the resulting blend has considerably improved toughness. While this is known, the proper choice of the blend components as well as of the blending conditions still is to a large extent left to the experimenter who, after a number of trial runs, arrives at a satisfactory composition and process.

Generally speaking, it is very difficult to prepare a supertough polyamide with high stiffness or to even predict under what conditions or with what components such a composition could be made.

It is, therefore, highly desirable to be able to select in advance compatibilizer B for a given crystalline polyolefin C to be blended with matrix polyamide A under predetermined blending conditions in order to obtain the maximum degree of improvement of notched Izod impact strength for a given flex modulus (which can be calculated in advance from the flex moduli of the components), and to obtain in fact such improvement with a minimum amount of experimentation.

SUMMARY OF THE INVENTION

According to the present invention, there is now provided a process for melt-blending at a shear rate of about 100–200 sec$^{-1}$ at least one polyamide A having a number average molecular weight, $M_n$, of about 5,000–35,000 with a crystalline polyolefin C incompatible with polyamide A, having a number average molecular weight, $M_n'$, of about 10,000–1,000,000 in the presence of a compatibilizing rubbery polymer B having a glass transition temperature, Tg, of at most $-20°$ C. and capable of chemically or physically associating with both polyamide A and crystalline polyolefin C, the ratio of melt viscosity of polyamide A, $MV_A$, to melt viscosity of polyolefin C, $MV_C$, at the process temperature and at a shear rate of about 100–200 sec$^{-1}$ being about 0.1 to 1.2, preferably 0.2–1.0 and especially 0.4–0.8, to form a multiphase blend having a notched Izod impact strength of more than about 535 J/m;

said process comprising melt-blending polymers B and C with polyamide A in their respective weight percentages b%, c%, and a% such that (1) $a+b+c=100$;
(2) $b=3$ to 15;
(3) $b+c>10$;
(4) $1:1<a/c<20:1$; and
(5) $1:5<b/c<3:1$, at a process temperature which is higher than the highest melting temperature of any crystalline polymer present and higher than the highest glass transition temperature of any amorphous polymer present but lower than the lowest temperature at which any polymer begins to significantly degrade, under residence time and mixing energy conditions such that polyamide A forms a continuous phase, while polymers B and C form a particulate phase dispersed in the continuous phase.

DETAILED DESCRIPTION OF THE INVENTION

Definition: For the purpose of the present disclosure and claims, the terms "associating" and "association" include both a chemical and a physical interaction, including, for example, a chemical reaction, especially grafting, hydrogen bonding, and ionic bonding; as well as electrostatic attraction, and magnetic attraction. Association of two polymers is facilitated by, or necessarily requires, a low interfacial tension between them.

A compatibilizing polymer normally would have an aliphatic chain, which would make it compatible with polyolefins, and at least one polar functional group, which would make it compatible with polyamides. Typical such functional groups include, e.g., carbonyl-containing groups such as carboxyl, ionic carboxylate, ester, and ketone; hydroxyl, thione, amine, and amide. In order to determine whether a prospective compatibilizing polymer B is suitable for the proposed application, one only needs to perform two experiments, namely, prepare under the proposed process conditions a blend of polymer B with polyamide A and a blend of polymer B with crystalline polyolefin C in the desired ratios and determine the notched Izod strength of each such resulting blend. If the notched Izod value of the first blend is higher than the notched Izod value of the corresponding polyamide, and the notched Izod value of the second blend is higher than that of the polyolefin, then the selected polymer B is a suitable compatibilizing agent.

Proper blending conditions will depend on the particular needs. The components always are blended in the melt, either in one step or in two steps (by first preblending polymers B and C and then blending the resulting material with polymer A), so long as blending in the presence of polymer A is conducted with sufficient energy to produce uniform dispersion, preferably having dispersed particles of small size, for example, 3 micrometers or less. Preblending B with A is generally not recommended because these two polymers may react chemically or crosslink to the point of becoming difficult or impossible to melt process, or their viscosity may become so high that a uniform dispersion of B and C in A cannot be obtained. Blending in a twin-screw extruder has been found to produce consistently satisfactory and reproducible results but other blending equipment may provide equally acceptable results. Such other equipment includes, for example, Buss Kneader. Blending is carried out at a temperature at which all the blend components are molten but not so high that any of them would begin to degrade. The blend polymers should not be susceptible of crosslinking under the blending conditions but should remain thermoplastic.

Typical matrix polyamides can be highly or partly crystalline or amorphous, or can themselves be blends of crystalline and amorphous polymers. They can be made by condensation of substantially equimolar amounts of a saturated aliphatic, aromatic, or cycloaliphatic dicarboxylic acid having 4–12 carbon atoms with a primary or secondary aliphatic or cycloaliphatic diamine having 4–12 carbon atoms. Representative dicarboxylic acids include succinic, adipic, azelaic, sebacic, 1,12-dodecanoic, 1,4-cyclohexanedicarboxylic, terephthalic, and isophthalic. Representative diamines include tetramethylenediamine, pentamethylenediamine, hexamethylenediamine, dodecamethylenediamine, and 1,4-cyclohexanediamine. Other suitable polyamides can be made by homopolymerization, with ring opening, of lactams having from 5 to 13 ring atoms. Representative lactams include δ-valerolactam, ε-caprolactam, ω-laurolactam, etc. Suitable polyamides also include polyamides made by polycondensation of two or more components of the same type, such as, for example, two different dicarboxylic acids with one diamine, or two different diamines with one dicarboxylic acid, or one diamine, one dicarboxylic acid, and one lactam, or a polyamide in which a portion of the dicarboxylic acid is terephthalic acid and another portion is isophthalic acid, etc. Preferably, the polyamides, if they are crystalline, should have a melting point in excess of 160° C. It is further preferred that the polyamides have a relative viscosity, determined in 90% aqueous formic acid, of about 20-300. Especially preferred polyamides include, for example, poly(hexamethylene adipamide) or nylon 66, poly(ε-caprolactam) or nylon 6, poly(hexamethylene terephthalamide), nylon 12 and nylon 12,12. Compatible blends of two or more polyamides may be used, instead of a single polyamide, to form the matrix component of the blend. A satisfactory polyamide will have a notched Izod impact strength of more than 166 J/m and a flex modulus of more than 1380 MPa, but a more desirable polyamide will have a notched Izod value of more than 330 J/m and a flex modulus of more than 1170 MPa. The best polyamides in this more desirable category will have a notched Izod value of more than about 555 J/m.

Typical crystalline polyolefins include both homopolymers and random or block copolymers, having a flexural modulus of more than about 345 MPa. Suitable crystalline polyolefins include, e.g., high density and low density, random and linear polyethylene; syndiotactic and isotactic polypropylene, poly(butene-1), poly(isobutene), poly(2-methylpentene-1), and poly(hexene-1). Crystalline polyolefins incompatible with matrix polymer A do not have functional groups capable of reacting or associating with polymer A. For economic reasons, the most preferred crystalline polyolefin, having high flexural modulus and high heat distortion temperature, is isotactic polypropylene, which is readily available at a modest price, comparable to that of high density polyethylene.

Suitable compatibilizing polymers are normally known as soft polymers; that is, they have a low flexural modulus. Usually, they have predominant amorphous portions. Many of those polymers have been conventionally used in the prior art for toughening polyamides. Suitable compatibilizing polymers include, for example, ethylene copolymers with alkyl acrylates and methacrylates such as ethylene/ethyl acrylate and ethylene/methyl methacrylate copolymers; ethylene terpolymers with alkyl acrylates or methacrylates and carbon monoxide such as ethylene/CO/n-butyl acrylate, ethylene/CO/methyl methacrylate, and ethylene/CO/ethyl acrylate terpolymers; ethylene copolymers with an epoxy group-containing monomer and, optionally, a third monomer such as, e.g., ethylene/vinyl acetate/glycidyl methacrylate and ethylene/n-butyl acrylate/glycidyl methacrylate terpolymers; styrene/ethylene-butylene/styrene block copolymers containing either a carboxylic group or an epoxy group; partially ionized copolymers of ethylene with an α, β-unsaturated carboxylic acid and optionally with a third comonomer, including ethylene/acrylic acid, ethylene/methacrylic acid, ethylene/vinyl acetate/acrylic acid, ethylene/butyl acrylate/methacrylic acid, and ethylene/vinyl acetate/monomethyl ester of maleic acid copolymers, each neutralized in part with zinc, magnesium, calcium, sodium, potassium, or lithium ions; anhydride group-containing polymers such as, for example, EPDM elastomers having maleic anhydride or glycidyl methacrylate grafted thereon such as ethylene/propylene/1,4-hexadiene elastomer or ethylene/propylene/1,4-hexadiene/norbornene elastomer grafted with maleic anhydride, styrene/ethylene-butylene/styrene block copolymers grafted with maleic anhydride or glycidyl methacrylate, and terpolymers of ethylene with maleic anhydride and another monomer such as ethylene/vinyl acetate/maleic anhydride terpolymer. Preferred compatibilizing polymers have pendant anhydride or glycidyl groups or both. The most preferred compatibilizing polymer B is an EPDM elastomer having at least one of maleic anhydride and glycidyl methacrylate moieties grafted thereon, each in an amount of about 0.2-2% of the total elastomer weight. When polymer A is nylon 6 or nylon 66, and crystalline polyolefin C is polypropylene, the following relationship preferably should exist:

$$1:3 < b/c < 3:1$$

and the preferred amount of this compatibilizing polymer is 5-15% of the blend.

Figure 1:
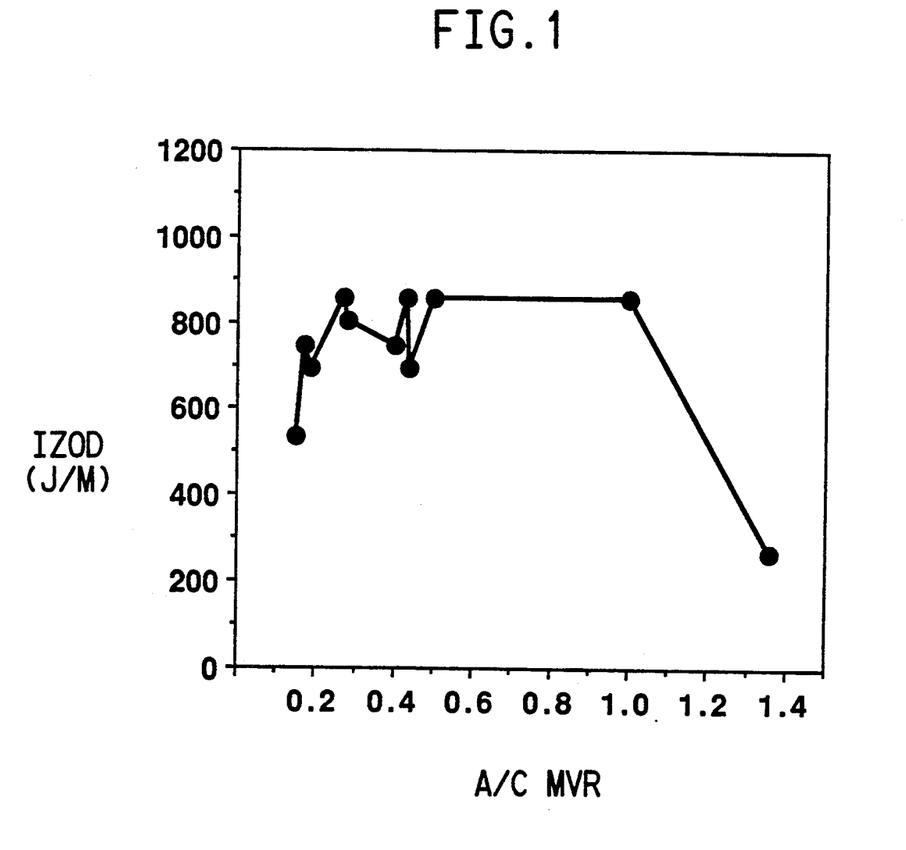
FIGS. 1 through 5 represent plots of notched Izod impact strength vs. melt viscosity ratio at a $10^4$ sec$^{-1}$ shear rate for representative multiphase blends of polyamide/maleic group-containing compatibilizing rubbery polymer/polypropylene. In all these graphs, the ordinate represents notched Izod impact strength in J/m, while the abscissa represents the melt viscosity ratio of polyamide A to crystalline polyolefin C.
Figure 2:
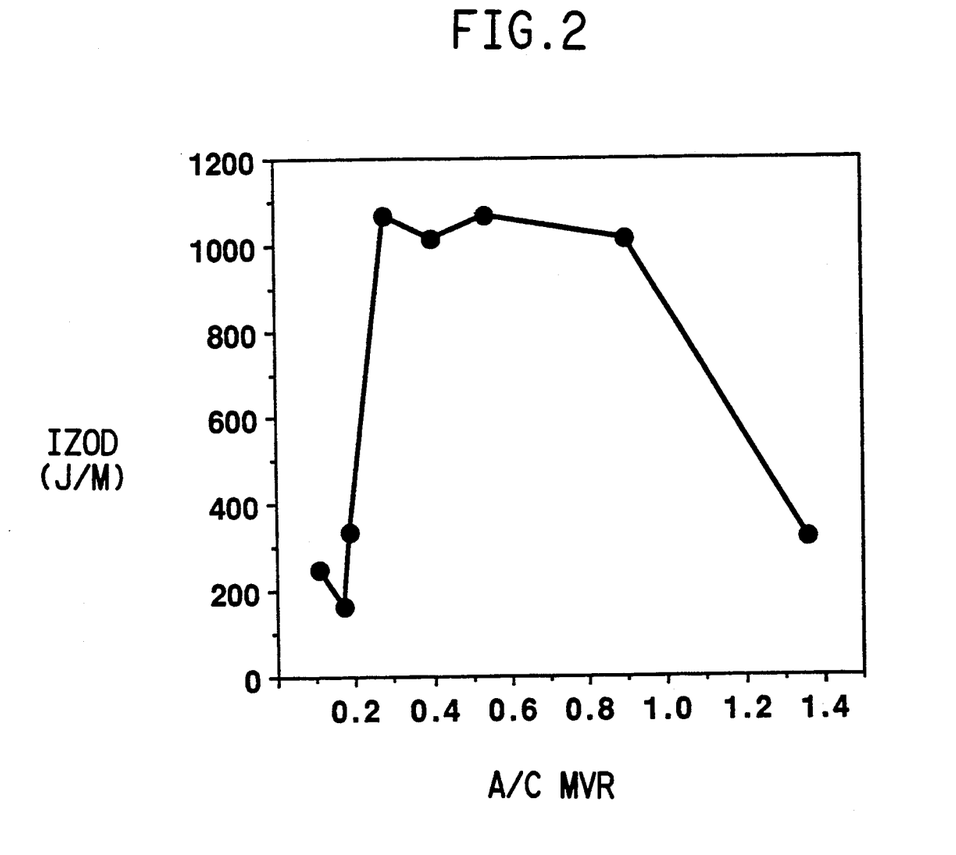
Figure 3:
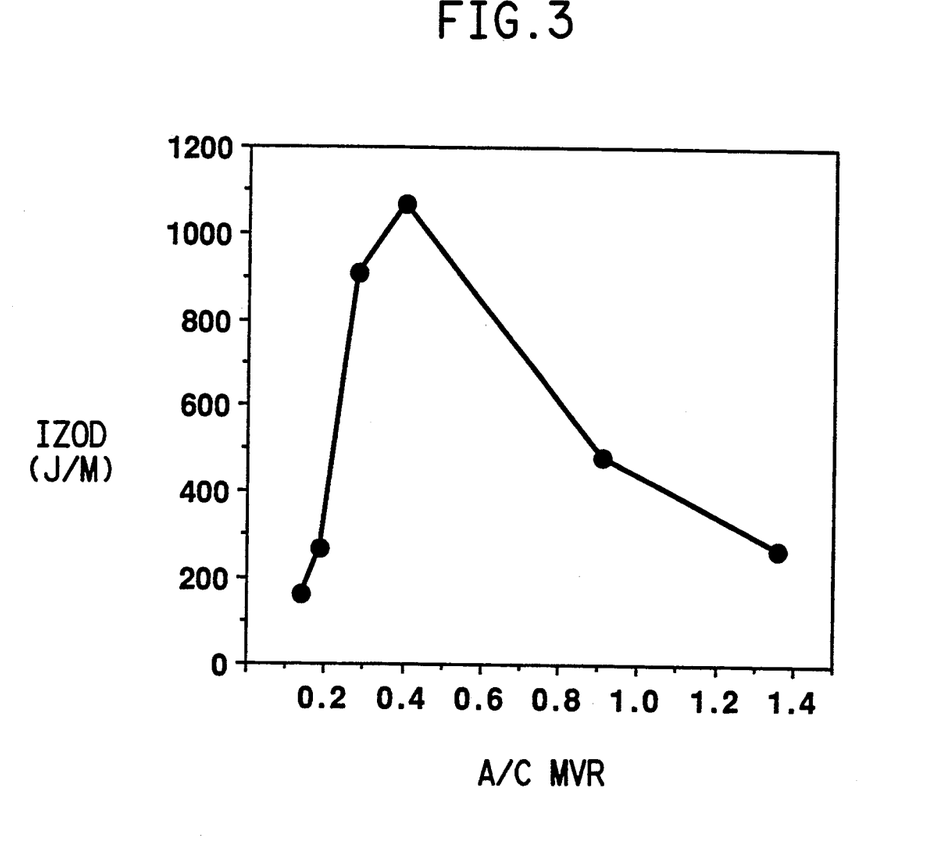
Figure 4:
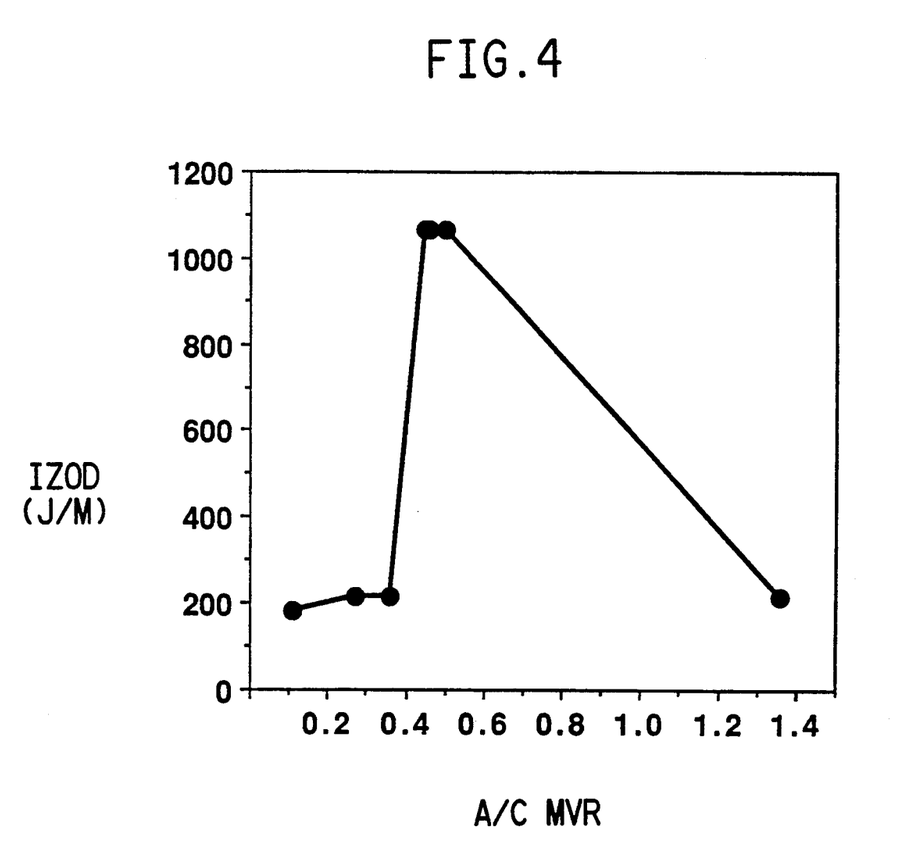
Figure 5:
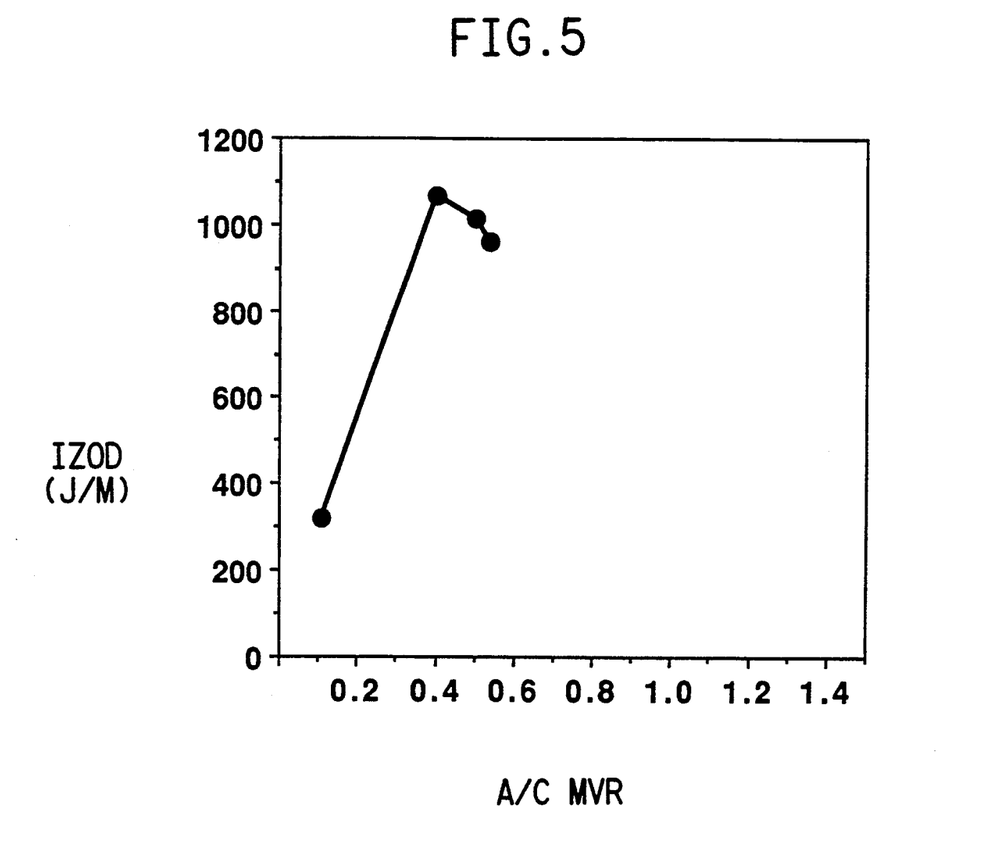

The preferred weight percentage of polyamide A is 50-95%, especially 60-90%. Within these ranges, supertough blends can be obtained within rather wide $MV_A/MV_C$ ratios, which ratios for the purpose of the present disclosure will be sometimes represented below as A/C MVR. This is illustrated in FIGS. 1 through 5 for blends of five compositions based on nylon 66 and nylon 6 (each as polyamide A), polypropylene (polyolefin C), and a compatibilizing polymer, an EPDM rubber grafted with maleic anhydride (polymer B). These figures, based on experiments described in the examples below, represent plots of notched Izod impact strength (determined according to ASTM standard D-256) vs. A/C MVR. The respective weight percentages of A in those experiments were as follows:

|        | A, % | B, % | C, % |
|--------|------|------|------|
| FIG. 1 | 85   | 10   | 5    |
| FIG. 2 | 80   | 10   | 10   |
| FIG. 3 | 75   | 10   | 15   |
| FIG. 4 | 70   | 10   | 20   |
| FIG. 5 | 60   | 10   | 30   |

It can be seen from those graphs that for a constant amount of B component, while varying the amounts of A and C, the A/C MVR range within which supertough blends can be obtained is wider for the compositions containing a larger amount of polyamide A. It is noted that the plot in FIG. 1 contains an irregularity in the A/C MVR region of about 0.35, which is believed to be fortuitous and not meaningful. However, a maximum usually is found, according to these plots, somewhere in the neighborhood of A/C MVR equal to about 0.4. For different viscosity ratios, which would depend on a different selection of polyamide and polyolefin, this maximum could be located elsewhere on the graph but could always be determined with sufficient precision to be useful in evaluating prospective resins. For practical purposes, one would not have to make such determinations for more than one or two compositions per set of polymers because the location of the maximum does not change significantly with the respective percentages of the components; it is the melt viscosity ratio that determines both the location of the maximum and the value of notched Izod impact strength at that location. Accordingly, it is entirely feasible and practical to establish such plots in advance for future reference for a number of polyamides and polyolefins, using any desired compatibilizing polymer.

As will be shown below, this invention makes it possible to obtain, with small amounts of polyolefin in the blend, compositions that have highly improved toughness and high stiffness; while with larger amounts of polyolefin in the blend, compositions having toughness and stiffness properties comparable to those of toughened polyamides of the prior art can be obtained at a much lower cost.

Generally speaking, the practice of this invention involves both a material selection and a selection of process parameters. The material selection involves the selection of polymers A, B, and C as well as of the molecular weight of each polymer. If the selection of all three polymers is imposed by commercial or other practical considerations, optimum toughness can be obtained for a specific weight ratio of those polymers; but if the composition is not critical, then it is possible to also optimize the toughness, e.g., by choosing a different polymer B or a different polymer C. If the weight ratios are imposed in advance, for example, for reasons of cost or of certain properties, e.g., the level of moisture absorption or shrinkage, then the optimum toughness can be obtained by selecting an appropriate polymer combination for operation at a given temperature; for example, A1/C1 at one temperature and A2/C2 at another temperature.

The process selection can involve, e.g., the selection of equipment, screw design, operating temperature, and shear. A twin-screw extruder preferably will be used in this process. However, it has been found that whatever other process parameters are employed, the toughness of the final blend is primarily dependent on the melt viscosity ratio of polymer A to polymer C. The temperature is selected according to the melting temperature of the polyamide selected and the lowest temperature at which any one of the polymers decomposes. In practice, the temperature range will be about 180°–300° C. In general, the larger the extruder the smaller is the shear. For a given machine, the higher is the speed of rotation of the screw (revolutions per minute) the higher is the shear. Shear also is affected by the screw design, the milder the severity of the screw, the smaller the shear. It has been determined experimentally, keeping in mind the above three factors, that the average shear experienced by polymers under a variety of conditions and equipment design is about 100 to 555 sec$^{-1}$. However, for practical purposes, it is sufficient to establish the process conditions for a fixed shear rate, say, 100$^{-1}$ sec.

This invention is now illustrated by representative examples of certain representative embodiments thereof, where all parts, proportions and percentages are by weight unless otherwise indicated. In all the examples, the melt viscosities were determined at a shear rate of 104 sec$^{-1}$.

POLYMERS

Polyamides (Polymer A)
A1- Nylon 66 with an RV of about 50–55
A2- Nylon 66 with an RV of about 40–43
A3- Nylon 6 with an RV of 58–62.

A1 and A2 were commercial resins sold by E. I. du Pont de Nemours and Company under the trademark ZYTEL ®. The nylon 6 resin A3 is sold by NYLON de MEXICO, S.A. under the trademark DURAMIDA ® 6.

Compatibilizing Rubbery Polymers (Polymer B)
B1- Styrene/ethylene-butylene/styrene copolymer grafted with about 2% of maleic anhydride, sold by Shell Company under the trademark KRATON ® FG 1901X.
B2- EPDM rubber containing about 0.12% of copolymerized norbornadiene, grafted with a monomer providing about 1.5% of succinic anhydride groups (maleic anhydride, maleic acid, or fumaric acid).
B3- EPDM rubber containing about 0.12% of copolymerized norbornadiene and grafted with a monomer providing about 2% of succinic anhydride groups.

Both B2 and B3 were commercial products of E. I. du Pont de Nemours and Company but B3 had a slightly lower molecular weight than B2.

B4 was a commercial EPDM rubber of E. I. du Pont de Nemours and Company containing 0.12% of norbornadiene but no succininc anhydride groups.

It is to be noted that, generally speaking, many compatibilizing rubbery polymers satisfying the requirements of Polymer B have been used in the past as toughening agents for a variety of engineering resins.

Crystalline Polyolefin (Polymer C)
C1- C3 Homopolymers of propylene, with molecular weights increasing from C1 to C3, sold by HIMONT CO. under the trademark PROFAX ® with respective commercial designations 6231, 6323, and 6723.
C4-Copolymer of propylene with ethylene, sold by HIMONT CO. under the trademark PROFAX ® 6823. The molecular weight of C4 was about the same as that of C3.

Additional compatibilizing polymer (Polymer D)
D1-Homopolymer of propylene grafted with about 0.8% of maleic anhydride, with a molecular weight about the same as C2. Sold by DU PONT CANADA under the trademark FUSABOND ®.

Extruders
M1-Werner & Pfleiderer (W&P), twin-screw, about 28 mm diameter. Trilobal mixing screws with five heating zones and a vacuum port at the end.
M2-W&P, twin-screw, about 30 mm diameter. Bilobal mixing screws with four heating zones and a vacuum port at the end.
M3-Similar to M1, except that the screw configuration is about twice as severe.
M4-twin-screw "ZSK" W&P, about 53 mm diameter. Trilobal mixing screws with nine heating zones and a vacuum port at the end.

Extrusion Conditions
All polymers were dry-mixed as pellets before feeding to the extruder. The total amount of material in extruders M1 through M3 was about 2–3 kg. The amount in M4 was about 200 kg. Each composition was extruded as a strand, which was pelletized and then injection-molded into test samples. In all extruders, the temperatures in all zones were set at the same level, about 20°–25° C. lower than the melt processing temperature because additional heat was supplied by shearing.

Molding Conditions
All the extruded pellets were dried overnight at 90° C. They were injection molded in a nominal 6-ounce (177 ml) machine made by HMP Company running at a cycle ratio of 20/20 (seconds/seconds). The processing temperature for nylon 66 was set at 260° C. and for nylon 6 at 240° C. for all four zones. The actual melting temperature of each type of nylon was about 20° C. higher than the set temperature. The mold temperature was about 40°–60° C. The molding specimens were 0.3175 cm thick and were either flex bar type (1.27×11.43 cm) or dog bone type (1.27×21.6 cm).

Testing Conditions (a) Melt viscosity was determined in a KAYNESS capillary rheometer according to ASTM D-3835-79 at a 104 sec$^{-1}$ shear rate.
(b) Flex modulus was determined according to ASTM D-790.
(c) Notched Izod impact strength was determined according to ASTM D-256.
(d) Tensile strength and elongation at break were determined according to ASTM D-638.

The above determinations (b) through (d) were made on samples dry as molded.

In Examples 1-36, polymer B always was B2.

EXAMPLES 1-11

These examples show that for a given polymer B and a given weight ratio of polymers A, B, and C the optimum notched Izod value was obtained for a certain A/C MVR measured at the processing temperature. For the particular polymer B and a given weight ratio (85/10/5), the flex modulus range was 1689 to 2068 MPa. Table 1, below, summarizes the operating conditions and the test results. It can be seen that the optimum notched Izod value (larger than 535 J/m) was obtained within the A/C MVR range of 0.17-1. A plot of impact strength vs. melt viscosity ratio is shown in FIG. 1, which is self-explanatory.

TABLE 1

| Example | 1 | 2 | 3 | 4 | 5 | 6 | 7 | 8 | 9 | 10 | 11 |
|---|---|---|---|---|---|---|---|---|---|---|---|
| Polymer A | A3 | A3 | A3 | A2 | A1 | A3 | A1 | A3 | A3 | A2 | A1 |
| Polymer C | C4 | C3 | C4 | C3 | C3 | C2 | C3 | C2 | C2 | C2 | C2 |
| Extr. temp., °C. | 290 | 270 | 280 | 290 | 300 | 290 | 280 | 280 | 270 | 290 | 300 |
| Extruder | M2 | M2 | M2 | M1 | M1 | M1 | M2 | M1 | M2 | M1 | M2 |
| Melt Visc., Pa.sec | | | | | | | | | | | |
| of A | 60 | 100 | 80 | 150 | 150 | 60 | 250 | 80 | 100 | 150 | 150 |
| of C | 400 | 580 | 420 | 550 | 530 | 150 | 580 | 180 | 200 | 150 | 110 |
| A/C MVR | 0.15 | 0.17 | 0.19 | 0.27 | 0.28 | 0.4 | 0.43 | 0.44 | 0.5 | 1.0 | 1.36 |
| Notched Izod, J/m | 534 | 747 | 694 | 854 | 801 | 747 | 854 | 694 | 854 | 854 | 267 |
| Flex mod., MPa | 2034 | 1724 | 2068 | 1689 | 1827 | 2068 | 2068 | 1758 | 1689 | 1724 | 1931 |

EXAMPLES 12-19

These examples illustrate the same principle as shown above, except that the A/B/C ratio was 80/10/10. Here, the optimum notched Izod value was obtained at an A/C MVR of 0.28-0.9. The flex modulus range in this series of experiments was 1517-1793 MPa. A plot of impact strength vs. melt viscosity ratio is shown in FIG. 2., while experimental data are provided in Table 2, below.

TABLE 2

| Example | 12 | 13 | 14 | 15 | 16 | 17 | 18 | 19 |
|---|---|---|---|---|---|---|---|---|
| Polymer A | A3 | A3 | A2 | A1 | A3 | A3 | A2 | A1 |
| Polymer C | C3 | C3 | C3 | C3 | C2 | C2 | C2 | C2 |
| Extruder | M1 | M1 | M1 | M1 | M1 | M1 | M1 | M2 |
| Extr. temp., °C. | 290 | 270 | 310 | 300 | 290 | 300 | 300 | 300 |
| Melt Visc., Pa.sec | | | | | | | | |
| of A | 60 | 100 | 75 | 150 | 60 | 60 | 100 | 150 |
| of C | 550 | 580 | 400 | 530 | 150 | 110 | 110 | 110 |
| A/C MVR | 0.11 | 0.17 | 0.19 | 0.28 | 0.4 | 0.54 | 0.9 | 1.36 |
| Notched Izod, J/m | 251 | 160 | 336 | 1067 | 1014 | 1067 | 1014 | 320 |
| Flex mod., MPa | 1724 | 1655 | 1724 | 1586 | 1517 | 1620 | 1517 | 1795 |

EXAMPLES 20-25

In this series of experiments, the A/B/C ratio was 75/10/15. The optimum notched Izod value was obtained within the A/C MVR range of 0.28-0.8, as shown in Table 3, below, and in FIG. 3. The flex modulus values in these experiments were within the range of 1448-1586 MPa.

TABLE 3

| Example | 20 | 21 | 22 | 23 | 24 | 25 |
|---|---|---|---|---|---|---|
| Polymer A | A3 | A2 | A1 | A3 | A2 | A1 |
| Polymer C | C3 | C3 | C3 | C2 | C2 | C2 |
| Extruder | M1 | M1 | M1 | M1 | M1 | M1 |
| Extr. temp., °C. | 280 | 300 | 300 | 290 | 300 | 300 |
| Melt visc., Pa. sec | | | | | | |
| of A | 80 | 100 | 150 | 60 | 100 | 150 |
| of C | 580 | 530 | 530 | 150 | 110 | 110 |
| A/C MVR | 0.14 | 0.19 | 0.28 | 0.4 | 0.91 | 1.36 |
| Notched Izod, J/m | 160 | 267 | 907 | 1067 | 480 | 267 |
| Flex mod., MPa | 1551 | 1586 | 1482 | 1448 | 1586 | 1448 |

EXAMPLES 26-32

The same principle is here illustrated for blends in which the A/B/C ratio was 70/10/20. The optimum notched Izod impact strength was obtained for the A/C MVR range of 0.45-0.50. It is believed that supertough compositions would be obtained within a range of about 0.40-0.60, although experiments supporting this full range have not been run. The experimental results are presented in table 4, below and further illustrated in FIG. 4. The range of flex modulus values for these experiments was 1413-1586 MPa.

TABLE 4

| Example | 26 | 27 | 28 | 29 | 30 | 31 | 32 |
|---|---|---|---|---|---|---|---|
| Polymer A | A3 | A2 | A1 | A3 | A3 | A3 | A1 |
| Polymer C | C3 | C3 | C3 | C2 | C2 | C2 | C2 |
| Extruder | M1 | M1 | M1 | M1 | M1 | M1 | M1 |
| Extr. temp., °C. | 290 | 290 | 290 | 300 | 285 | 305 | 300 |
| Melt visc., Pa.sec | | | | | | | |
| of A | 60 | 150 | 200 | 60 | 70 | 50 | 150 |
| of C | 550 | 550 | 550 | 110 | 150 | 100 | 110 |
| A/C MVR | 0.11 | 0.27 | 0.36 | 0.45 | 0.46 | 0.50 | 1.36 |
| Notched Izod, J/m | 182 | 214 | 214 | 1067 | 1067 | 1067 | 214 |
| Flex mod., MPa | 1551 | 1517 | 1551 | 1517 | 1448 | 1413 | 1586 |

EXAMPLES 33-36

Similar experiments were carried out with blends having an A/B/C ratio of 60/10/30. Optimum notched Izod values were obtained for an A/C MVR range of 0.40–0.54, which can be further extrapolated to 0.40–0.60. The flex modulus values were within the range of 1241–1379 MPa. The experimental results are presented in Table 5, and a plot of notched Izod impact strength vs. A/C MVR is shown in FIG. 5.

TABLE 5

| Example | 33 | 34 | 35 | 36 |
|---|---|---|---|---|
| Polymer A | A3 | A3 | A3 | A3 |
| Polymer C | C3 | C2 | C2 | C1 |
| Extruder | M1 | M1 | M1 | M1 |
| Extr. temp., °C. | 290 | 290 | 310 | 290 |
| Melt visc., Pa.sec | | | | |
| of A | 60 | 60 | 40 | 60 |
| of B | 550 | 150 | 80 | 110 |
| A/C MVR | 0.11 | 0.40 | 0.50 | 0.54 |
| Notched Izod, J/m | 320 | 1067 | 1014 | 961 |
| Flex mod., MPa | 1379 | 1310 | 1241 | 1379 |

EXAMPLES 37-42

These examples show that for a given A/B/C weight ratio, in this case, 80/10/10, and for given A and C, the value of notched Izod impact strength may depend on the $M_n$ of B. If A/C MVR is in the optimum range, substitution of B3 for B2 will affect that value only slightly; but when A/C MVR is outside the optimum range, the change of the notched Izod value can be dramatic. Table 6 summarizes the operating conditions and the results.

As can be seen, in each pair of experiments, the same A and the same C were used, but B was either B3 or B2. In Examples 37 and 38, A/C MVR was 0.45, which is in the optimum range (see FIG. 2). Therefore, the substitution of B2 for B3 did not significantly affect the notched Izod value, and both blends were supertough. In each one of Examples 39 and 40, run at different temperatures, A/C MVR was outside the optimum range, namely, 0.17 and 0.20. The blends were not supertough in either case, although there was an improvement of the notched Izod value when B2 was substituted for B3. Examples 40 and 41 also were run at different temperatures, so that A/C MVR was different in each case but in the optimum range. Substitution of B2 for B3 had virtually no effect on the notched Izod value.

TABLE 6

| Example | 37 | 38 | 39 | 40 | 41 | 42 |
|---|---|---|---|---|---|---|
| Polymer A | A3 | A3 | A3 | A3 | A1 | A1 |
| Polymer B | B3 | B2 | B3 | B2 | B3 | B2 |
| Polymer C | C2 | C2 | C3 | C3 | C3 | C3 |
| Extruder | M2 | M2 | M2 | M2 | M2 | M2 |
| Extr. temp., °C. | 270 | 270 | 270 | 260 | 290 | 280 |
| Extr. rev/min | 80 | 100 | 80 | 110 | 80 | 140 |
| Melt visc., Pa.sec | | | | | | |
| of A | 100 | 100 | 100 | 120 | 200 | 250 |
| of C | 220 | 220 | 580 | 600 | 540 | 560 |
| A/C MVR | 0.45 | 0.45 | 0.17 | 0.20 | 0.37 | 0.45 |
| Notched Izod, J/m | 908 | 774 | 203 | 534 | 935 | 854 |
| Flex mod., MPa | 1724 | 1931 | 1758 | 1586 | 1827 | 1827 |
| Tens. str., MPa | 49 | 52 | 49 | 50 | 50 | 55 |
| Elong. at br., % | 70 | 35 | 75 | 90 | 55 | 150 |

EXAMPLES 43-46

These examples show the effect of the chemical structure and amount of Polymer B. Increasing the amount of B also increases the impact strength, but this also decreases the flex modulus. Further, replacing B2 with B1 decreases the impact strength. These results are summarized in Table 7, below.

TABLE 7

| Example | 43 | 44 | 45 | 46 |
|---|---|---|---|---|
| Polymer A | A3 | A3 | A3 | A3 |
| Polymer B | B2 | B2 | B1 | B1 |
| Polymer C | C3 | C3 | C3 | C2 |
| Amount of Polymer B, % | 10 | 15 | 15 | 10 |
| Amount of Polymer C, % | 10 | 10 | 10 | 10 |
| Extruder | M2 | M2 | M2 | M2 |
| Extr. temp., °C. | 260 | 260 | 260 | 260 |
| Extr. rev/min | 110 | 110 | 110 | 110 |
| Melt visc., Pa.sec | | | | |
| of A | 120 | 120 | 120 | 120 |
| of C | 600 | 600 | 600 | 220 |
| A/C MVR | 0.2 | 0.2 | 0.2 | 0.55 |
| Notched Izod, J/m | 534 | 1068 | 694 | 182 |
| Flex mod., MPa | 1586 | 1379 | 1448 | 1655 |
| Tens. str., MPa | 50 | 45 | 50 | 59 |
| Elong. at br., % | 90 | 180 | 170 | 85 |

It is to be noted that an A/C MRV of 0.2 is not in the optimum range for a B2 level of 10% (Example 43, FIG. 2), while it is in the optimum range for a B2 level of 15% (Example 44, FIG. 3). Substitution of B1 for B2 results in a significant lowering of the notched Izod value. This suggests that B1 is a less effective toughening agent than B2, and that when it is used, the optimum A/C MVR range is narrower than when B2 is used. Essentially, what this means is that the absolute value of notched Izod impact strength will depend on the chemical structure of Polymer B, but the highest value will be obtained for each Polymer B when the value of A/C MVR is in the optimum range, which can be determined independently.

EXAMPLES 47-52

These examples are intended to show the relative unimportance under the optimum conditions of temperature, shear rate, or extruder screw severity. The experimental data and results are presented in Table 8, below. The A/B/C ratio in all these examples was 70/10/20. A was A3; B was B2; and C was C2. It can be seen from Examples 47-48 and 51-52 that when A/C MVR was maintained in the optimum range (see FIG. 4), a 15° C. increase of temperature did not affect the Izod value either for an extruder with a screw of mild severity or for one with a screw of high severity. Examples 48-49 show that the Izod value also was unaffected by an increase of revolutions per minute from 150 to 250. And, finally, Examples 49-51 show that this was true also for a change of screw design from mild to severe. In all these Examples, the blends were supertough.

TABLE 8

| Example | 47 | 48 | 49 | 50 | 51 | 52 |
|---|---|---|---|---|---|---|
| Extruder | M1 | M1 | M1 | M1 | M3 | M3 |
| Extr. rev/min | 160 | 105 | 150 | 250 | 160 | 160 |
| Extr. temp., °C. | 275 | 290 | 290 | 300 | 290 | 305 |
| Melt visc., Pa.sec | | | | | | |
| of A | 95 | 60 | 60 | 40 | 60 | 40 |
| of C | 220 | 160 | 160 | 110 | 160 | 100 |
| A/C MVR | 0.43 | 0.38 | 0.38 | 0.36 | 0.38 | 0.40 |
| Notched Izod, J/m | 1068 | 1068 | 1121 | 1014 | 1068 | 1094 |
| Flex mod., MPa | 1448 | 1620 | 1482 | 1551 | 1345 | 1380 |
| Tens. str., MPa | 41 | 46 | 48 | 48 | 48 | 44 |
| Elong. at br., % | 150 | 110 | 155 | 100 | 270 | 245 |

EXAMPLES 53-60

These examples demonstrate that production of supertough blends in an industrial size machine at industrial production rates can be readily achieved so long as A/C MVR is maintained within the optimum range. In the normal course of development work, scale up of processes run in laboratory equipment to industrial size equipment produces inconsistent or unreliable results; sometimes, the theory derived from laboratory work is proven wrong by large scale experiments. In the present case, however, the laboratory scale results have been corroborated by large scale experiments. The experimental conditions and results are presented in Table 9, below. Examples 53 and 56 are control experiments. All experiments were run in a 53 mm extruder (M4) at a production rate of 90-140 kg/hr. When Polymer B4 of Examples 53 was replaced with Polymer C3 in Example 54, the blend remained supertough at 25° C. When the amount of Polymer B2 was increased from 10% to 15% in Example 55, the blends remained supertough both at 25° C. and at 0° C. Examples 56 and 57 provide a comparison for a different polyamide, and examples 58-60 provide data for selected blends of polyamides, each one with the same crystalline polyolefin C2 and the same compatibilizing Polymer B2.

TABLE 9

| Example | 53 | 54 | 55 | 56 | 57 | 58 | 59 | 60 |
|---|---|---|---|---|---|---|---|---|
| Polymer A | A1 | A1 | A1 | A3 | A3 | A1/A3 | A1/A3 | A1/A3 |
| Polymer A, % | 81 | 80 | 75 | 80 | 80 | 60/20 | 20/60 | 40/40 |
| Polymer B2, % | 10 | 10 | 15 | 10 | 10 | 10 | 10 | 10 |
| Polymer B4, % | 9 | 0 | 0 | 10 | 0 | 0 | 0 | 0 |
| Polymer C2, % | — | 0 | 0 | — | 10 | 10 | 10 | 10 |
| Polymer C3, % | — | 10 | 10 | — | 0 | 0 | 0 | 0 |
| Extr. rev/min | 250 | 255 | 250 | 200 | 200 | 250 | 250 | 250 |
| Extr. temp., °C. | 310 | 310 | 315 | 265 | 260 | 300 | 290 | 285 |
| Rate, kg/hr | 113 | 109 | 100 | 113 | 127 | 136 | 125 | 132 |
| Melt visc. Pa.sec | | | | | | | | |
| of A1 | 125 | 125 | 110 | — | — | 150 | 200 | 225 |
| of A3 | — | — | — | 110 | 120 | 40 | 60 | 70 |
| of C2 | — | — | — | — | 220 | 110 | 160 | 190 |
| of C3 | — | 380 | 300 | — | — | — | — | — |
| A1/C MVR | — | 0.33 | 0.37 | — | — | 1.36 | 1.25 | 1.18 |
| A3/C MVR | — | — | — | — | 0.55 | 0.36 | 0.38 | 0.37 |
| Notched Izod at 25° C., J/m | 1041 | 934 | 1254 | 934 | 1148 | 1196 | 1238 | 1228 |
| Notched Izod at 0° C., J/m | 828 | 267 | 1068 | 828 | 240 | 262 | 358 | 320 |
| Flex mod., MPa | 1586 | 1655 | 1448 | 1551 | 1758 | 1586 | 1586 | 1586 |
| Tensile str., MPa | 53 | 53 | 49 | 49 | 55 | 51 | 51 | 50 |
| Elong. at br., % | 55 | 65 | 120 | 40 | 60 | 135 | 135 | 120 |

EXAMPLES 61-64

These examples show the importance of using a crystalline polyolefin C that is incompatible with polyamide A. As long as this condition is satisfied, and as long as A/C MVR is in the optimum range, supertough blends are obtained in the presence of compatibilizing Polymer B2. However, when crystalline polyolefin C has functional groups such that it can react or associate with the polyamide, supertough blends are not obtained. It is known in the art that when maleic anhydride-grafted polypropylene is blended with a polyamide, only modest improvement of notched Izod impact strength is obtained, from, say, initial 30 to maybe 110 J/m, irrespective of the amount of such polypropylene. On the other hand, a grafted elastomer of the type used in this invention as compatibilizing polymer B can improve the impact strength considerably, as also is known. The present inventor believes that when ungrafted crystalline polyolefin C is used, C and compatibilizing polymer B can form a core/shell structure, with C being the core and B the shell. The large core/shell particle interacts with nylon to improve the impact strength to a greater extent than the sum of the small improvement possible with grafted polypropylene acting independently of B and the incremental improvement obtained with the smaller particle of B. These results, although perhaps unexpected at first blush, are shown in Table 10, below. Here, C3 is ungrafted polypropylene, while D1 is polypropylene grafted with maleic anhydride, as explained above.

TABLE 10

| Example | 61 | 62 | 63 | 64 |
|---|---|---|---|---|
| Polymer A1, % | 80 | 80 | 85 | 85 |
| Polymer B2, % | 10 | 10 | 10 | 10 |
| Polymer C3, % | 10 | 0 | 5 | 0 |
| Polymer D1 | 0 | 10 | 0 | 5 |
| Extr. temp., °C. | 280 | 280 | 280 | 280 |
| Extr., rev/min | 140 | 110 | 140 | 110 |
| Melt visc., Pa.sec | | | | |
| of A | 250 | 250 | 250 | 250 |
| of C | 560 | — | 560 | — |
| of D1 | — | 125 | — | 125 |
| A/C MVR | 0.45 | — | 0.45 | — |
| Notched Izod, J/m | 854 | 294 | 854 | 278 |
| Flex mod., MPa | 1827 | 1620 | 2103 | 1793 |
| Tens. str., MPa | 55 | 59 | 58 | 58 |
| Elong. at break, % | 150 | 85 | 80 | 70 |

What is claimed is:

1. Process for melt-blending at a shear rate of about 100-200 sec$^{-1}$ at least one polyamide A having a number average molecular weight, $M_n$, of about 5,000-35,000 with a crystalline polyolefin C incompatible with polyamide A, having a number average molecular weight, $M_n'$, of about 10,000-1,000,000 and a flexural modulus of more than about 345 MPa in the presence of a compatiblizing rubbery polymer B having a glass transition temperature, Tg, of at most −20° C. and capable of chemically or physically associating with both polyamide A and crystalline polyolefin C, the ratio of melt viscosity of polyamide A, $MV_A$, to melt viscosity of polyolefin C, $MV_C$, at the process temperature and at a shear rate of about 100-200 sec$^{-1}$ being about 0.37–0.8 to form a multiphase blend having a notched Izod impact strength of more than about 535 J/m;

said process comprising melt-blending polymers B and C with polyamide A in their respective weight percentages b %, c %, and a % such that
(1) a+b+c=100;
(2) b=3 to 15;
(3) b+c>10;
(4) 1:1<a/c<20:1; and
(5) 1:5<b/c<3:1, at a process temperature which is higher than the highest melting temperature of any crystalline polymer present and higher than the highest glass transition temperature of any amorphous polymer present but lower than the lowest temperature at which any polymer begins to significantly degrade, under residence time and mixing energy conditions such that polyamide A forms a continuous phase, while polymers B and C form a particulate phase dispersed in the continuous phase.

2. The process of claim 1 wherein polyamide A is selected from the group consisting of nylon 6, nylon 66, nylon 12, nylon 12,12, and poly(hexamethylene terephthalamide).

3. The process of claim 1 wherein the crystalline polyolefin C is selected from the group consisting of polyethylene, polypropylene, poly(butene-1), and poly(2-methylpentene-1).

4. The process of claim 1 wherein the compatibilizing polymer B is an ethylene copolymer with at least one other ethylenically unsaturated comonomer and has pendant anhydride or glycidyl groups.

5. A process of claim 1 carried out in a twin-screw extruder.

6. The process of claim 1 wherein the weight proportion of polyamide A in the blend is 50–95%.

7. The process of claim 6 wherein the weight proportion of polyamide A in the blend is 60–90%.

8. A multiphase composition having a notched Izod impact strength of more than about 535 J/m, made by melt-blending at a shear rate of about 100–200 sec$^{-1}$ at least one polyamide, A, selected from the group consisting of nylon 6 and nylon 66 having a number average molecular weight, $M_n$, of about 5,000–35,000, with crystalline polypropylene, C, having a number average molecular weight, $M_n'$, of about 10,000–1,000,000 and a flexural modulus of more than about 345 MPa, in the presence of an EPDM elastomer grafted with at least one of maleic anhydride and glycidyl methacrylate, B, each grafted portion, when present, being present in an amount of 0.2–2% of grafted elastomer B, elastomer B having a glass transition temperature, Tg, of at most −20° C., the ratio of melt viscosity of nylon, $MV_A$, to melt viscosity of polypropylene, $MV_C$, at the process temperature and at a shear rate of about 100–200 sec$^{-1}$ being about 0.4 to 0.8;

said process comprising melt-blending polymers B and C with polyamide A in their respective weight percentages b %, c %, and a % such that
(1) a+b+c=100;
(2) a≧60;
(3) b=3 to 15;
(4) b+c>10;
(5) 1:1<a/c<20:1; and
(6) 1:3<b/c<3:1, at a process temperature which is higher than the highest melting temperature of any crystalline polymer present and higher than the highest glass transition temperature of any amorphous polymer present but lower than the lowest temperature at which any polymer begins to significantly degrade, under residence time and mixing energy conditions such that polyamide A forms a continuous phase, while polymers B and C form a particulate phase dispersed in the continuous phase.

* * * * *